(12) United States Patent
Foti et al.

(10) Patent No.: US 9,445,399 B2
(45) Date of Patent: Sep. 13, 2016

(54) METHOD AND APPARATUS FOR ASSOCIATING SERVICE PROVIDER NETWORK IDENTIFIERS WITH ACCESS NETWORK IDENTIFIERS

(71) Applicant: Telefonaktiebolaget L M Ericsson (publ), Stockholm (SE)

(72) Inventors: George Foti, Dollard des Ormeaux (CA); Peter Hedman, Helsingborg (SE); Juan Antonio Sanchez Herrero, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 544 days.

(21) Appl. No.: 13/788,958

(22) Filed: Mar. 7, 2013

(65) Prior Publication Data

US 2013/0318218 A1    Nov. 28, 2013

Related U.S. Application Data

(60) Provisional application No. 61/651,804, filed on May 25, 2012.

(51) Int. Cl.
*G06F 15/16* (2006.01)
*H04W 72/04* (2009.01)
(Continued)

(52) U.S. Cl.
CPC ...... *H04W 72/0406* (2013.01); *H04L 41/0806* (2013.01); *H04W 4/005* (2013.01); *H04W 60/00* (2013.01); *H04W 8/265* (2013.01)

(58) Field of Classification Search
CPC .................................................. H04L 41/0806
USPC .......................................... 709/222; 370/328
See application file for complete search history.

(56) References Cited

U.S. PATENT DOCUMENTS 5,678,179 A    10/1997  Turcotte et al.
8,780,796 B1 *  7/2014  Ballal ................ H04W 76/022
                                                              370/328
(Continued)

FOREIGN PATENT DOCUMENTS

WO    2009103623 A2    8/2009
WO    2011062841 A1    5/2011
(Continued)

OTHER PUBLICATIONS

Etsi TS 102 690 V1.1.1, "Machine-to-Machine Communications (M2M); Functional Architecture", Oct. 2011—http://www.etsi.org/deliver/etsi_ts/102600_102699/102690/01.01.01_60/ts_102690v010101p.pdf p. 33-68.*
(Continued)

*Primary Examiner* — Douglas Blair
(74) *Attorney, Agent, or Firm* — Murphy, Bilak & Homiller, PLLC

(57) ABSTRACT

An access network sends allocation information to an external service provider network (SPN), responsive to a wireless device establishing a data session with the access network for communicating with the SPN. The allocation information indicates the Internet Protocol (IP) address assigned to the wireless device by the access network for the data session and an external identifier to be used by the SPN in identifying the wireless device to the access network. Subsequently, the SPN receives a service provider network identifier and point of contact information in signaling sent from the wireless device, and binds the service provider network identifier to the external identifier that is associated with the IP address indicated in the point of contact information. This binding enables the SPN to trigger communications targeting the service provider network identifier of the wireless device, by sending triggering signaling to the access network that includes the bound external identifier.

27 Claims, 9 Drawing Sheets

(51) Int. Cl.
  *H04L 12/24* (2006.01)
  *H04W 4/00* (2009.01)
  *H04W 60/00* (2009.01)
  *H04W 8/26* (2009.01)

(56) References Cited

U.S. PATENT DOCUMENTS

| | | | |
|---|---|---|---|
| 8,854,960 B2 | 10/2014 | Jain et al. | |
| 8,953,508 B2 | 2/2015 | Zheng et al. | |
| 2009/0023443 A1* | 1/2009 | Kieselmann | H04L 63/08 455/433 |
| 2009/0129263 A1 | 5/2009 | Osborn et al. | |
| 2010/0008259 A1 | 1/2010 | Yoon et al. | |
| 2011/0125925 A1* | 5/2011 | Bouthemy et al. | 709/250 |
| 2011/0128911 A1* | 6/2011 | Shaheen | 370/328 |
| 2011/0164107 A1 | 7/2011 | Tian et al. | |
| 2011/0207491 A1 | 8/2011 | Swaminathan et al. | |
| 2012/0042073 A1 | 2/2012 | Lassborn et al. | |
| 2012/0257571 A1 | 10/2012 | Liao et al. | |
| 2012/0265983 A1 | 10/2012 | Yegin et al. | |
| 2012/0302229 A1 | 11/2012 | Rönneke | |
| 2013/0016657 A1* | 1/2013 | Muhanna et al. | 370/328 |
| 2013/0017827 A1 | 1/2013 | Muhanna et al. | |
| 2013/0142118 A1* | 6/2013 | Cherian | H04L 45/00 370/328 |
| 2013/0188515 A1* | 7/2013 | Pinheiro et al. | 370/254 |
| 2013/0196630 A1 | 8/2013 | Ungvari et al. | |
| 2013/0203412 A1 | 8/2013 | Starsinic et al. | |
| 2013/0212236 A1 | 8/2013 | Foti et al. | |
| 2013/0273855 A1* | 10/2013 | Cherian et al. | 455/68 |
| 2013/0279373 A1 | 10/2013 | Ding et al. | |
| 2013/0297744 A1* | 11/2013 | Foti | 709/219 |
| 2013/0310027 A1* | 11/2013 | Foti et al. | 455/432.1 |
| 2013/0315155 A1 | 11/2013 | Foti et al. | |
| 2013/0318218 A1 | 11/2013 | Foti et al. | |
| 2013/0332627 A1* | 12/2013 | Skog et al. | 709/244 |
| 2013/0339438 A1* | 12/2013 | Cherian | H04W 4/005 709/204 |
| 2014/0086143 A1* | 3/2014 | Foti et al. | 370/328 |
| 2014/0086144 A1* | 3/2014 | Foti et al. | 370/328 |
| 2014/0089442 A1* | 3/2014 | Kim et al. | 709/206 |
| 2014/0128113 A1* | 5/2014 | Zisimopoulos et al. | 455/466 |
| 2014/0185522 A1* | 7/2014 | Xu | 370/328 |
| 2014/0219182 A1* | 8/2014 | Chandramouli et al. | 370/328 |
| 2014/0286237 A1 | 9/2014 | Bhalla | |
| 2015/0045074 A1 | 2/2015 | Wong et al. | |

FOREIGN PATENT DOCUMENTS

| | | | |
|---|---|---|---|
| WO | 2011098150 A1 | | 8/2011 |
| WO | WO 2011098150 A1 | * | 8/2011 |
| WO | WO 2012142618 A2 | * | 10/2012 |
| WO | 2013115946 A1 | | 8/2013 |

OTHER PUBLICATIONS

European Telecommunications Standards Institute. "Machine-to-Machine communications(M2M); Functional architecture." ETSI Technical Committee Machine-to Machine Communications (M2M),Technical Specification, ETSI TS 102 690 V1.1.9 (Sep. 2012), pp. 1-280.

Third Generation Partnership Project, "3GPP TS 23.682 V11.0.0 (Mar. 2012)", 3rd Generation Partnership Project; Technical Specification Group Services and System Aspects; Architecture enhancements to facilitate communications with packet data networks and applications (Release 11). Mar. 2012. pp. 1-24.

Third Generation Partnership Project, "3GPP TS 23.682 V11.3.0 (Dec. 2012)", 3rd Generation Partnership Project; Technical Specification Group Services and System Aspects; Architecture enhancements to facilitate communications with packet data networks and applications (Release 11). Dec. 2012. pp. 1-29.

Author Unknown, "ETSI TS 102 690 V2.0.1 (Dec. 2011)", ETSI. Technical Specification. Machine-to-Machine Communications (M2M); Functional Architecture. Dec. 2011. pp. 1-238.

Author Unknown, "Liaison Statement Answer to 3GPP SA2 on MTC Identification Aspects", ETSI TC M2M. 3GPP TSG-SA WG1 Meeting #55; S1-112213; M2M(11)0519r3. Aug. 8-12, 2011. pp. 1-2. Dublin, Ireland.

3rd Generation Partnership Project, "3GPP TS 23.682 V11.1.0 (Jun. 2012)," 3rd Generation Partnership Project; Technical Specification Group Services and System Aspects; Architecture enhancements to facilitate communications with packet data networks and applications (Release 11). Jun. 2012. pp. 1-27.

3rd Generation Partnership Project, "3GPP TR 23.888 V1.6.1 (Feb. 2012)," 3rd Generation Partnership Project; Technical Specification Group Services and System Aspects; System Improvements for Machine-Type Communications (Release 11). Feb. 2012. pp. 1-165.

Author Unknown, "Mapping Aspects for ETSI M2M Architecture," 3GPP TSG SA WG2 Meeting #85; TD S2-112291; May 16-20, 2011. pp. 1-11. Xi'an, China.

Author Unknown, "M2M Service Enablement," Telefon AB LM Ericsson; M2M(12)19-076. Mar. 8, 2012. pp. 1-10.

* cited by examiner

METHOD AND APPARATUS FOR ASSOCIATING SERVICE PROVIDER NETWORK IDENTIFIERS WITH ACCESS NETWORK IDENTIFIERS

RELATED APPLICATIONS

This application claims priority from the U.S. provisional application filed on 25 May 2012 and assigned Application Ser. No. 61/651,804 and which is incorporated herein by reference.

TECHNICAL FIELD

The present invention generally relates to access networks and service provider networks external to such access networks, and particularly relates to obtaining and using external identifiers for devices connecting to a service provider network through an access network.

BACKGROUND

In an environment in which Machine-to-Machine (M2M) devices are connected to an M2M service provider (SP) through an access network provided by another entity, the M2M service provider effectively creates a service layer on top of the access network. This service layer is used to deliver services to the M2M devices, but it will be understood that to identify devices on the network there is a requirement for one or more identities on the access network to use in providing such services. In the European Telecommunications Standards Institute (ETSI) M2M framework, the M2M SP interworks with the access network, for the M2M devices that have subscribed to the services provided by the M2M SP. This interworking is typically performed using an external identifier selected for that purpose. Other available identifiers include the Mobile Station International Subscriber Directory Number (MSISDN), the Internet Protocol Multimedia Public Identity (IMPU), etc.

External identifiers are typically allocated by the access network for respective M2M devices, and are used for interworking purposes between the access network and the service provider network. Use of the external identifier means that the access network does not have to share the IMSI or other such identifier, which is typically reserved for use as an access network private identity, and which is not used on external (public) interfaces, such as the interface with the service provider network.

The Third Generation Partnership Project (3GPP) R11 standards define external identifiers. As defined, an external identifier is associated only with MTC Device triggering procedures. However, the 3GPP specification does not describe how external networks can acquire the external identifier of a given M2M device for interworking purposes. Furthermore, the M2M ETSI standard does not consider the use of the MTC Device triggering procedure and the mechanism to acquire external identifiers from an access network, for triggering targeted M2M devices via the access network.

SUMMARY

In one aspect of the teachings herein, an access network sends allocation information to an external service provider network, responsive to a wireless device establishing a data session with the access network for communicating with the service provider network, e.g., for sending registration signaling. The allocation information indicates the Internet Protocol (IP) address assigned to the wireless device by the access network for the data session and an external identifier to be used by the service provider network in identifying the wireless device to the access network. Subsequently, the service provider network receives a service provider network identifier and point of contact information from the wireless device in signaling sent from the wireless device. The point of contact information indicates the IP address allocated to the wireless device as its Point-of-Contact (PoC). The point of contact information may comprise the allocated IP address, or may comprise a Fully Qualified Domain Name (FQDN) that resolves to the IP address.

In any case, it will be understood that the service provider network receives signaling from the wireless device, e.g., M2M registration signaling, where that signaling indicates the IP address of the wireless device, as assigned by the access network. The service provider network checks whether the IP address matches any IP address indicated in any earlier-received allocation information and, based on recognizing such a match, the service provider network binds the associated external identifier, as known from the allocation information having the matching IP address, with the service provider network identifier as known from the device signaling. The IP address also may be bound to external identifier, as point-of-contact (PoC) information for the wireless device. Such binding enables the service provider network to trigger communications targeting the wireless device, by sending triggering signaling to the access network that identifies the wireless device via the bound external identifier.

In one embodiment, a first method is implemented at a network node associated with the service provider network. The method includes receiving allocation information from a node associated with an access network, where the allocation information indicates an IP address assigned by the access network to a wireless device that has established a data session with the access network for communicating with the service provider network. The allocation information further indicates an external identifier assigned by the access network, for use by the service provider network in identifying the wireless device to the access network.

Correspondingly, the first method further includes subsequently receiving a service provider network identifier and point of contact information from the wireless device communicating with the service provider network through the access network. The service provider network learns the IP address from the point of contact information, as allocated by the access network as the PoC for the wireless device. The PoC is, for example, an M2M PoC of the wireless device in an embodiment, where the M2M device hosts an M2M application that is authorized to use or operate with a service provided by the service provider network as an M2M network.

In any case, responsive to recognizing that the point of contact information of the wireless device matches an IP address indicated in allocation information previously received by the service provider network, the method includes binding the service provider network identifier to the external identifier that was indicated in the allocation information that includes the matching IP address. The binding establishes a mapping between the external identifier and the service provider network identifier, for subsequent use by the service provider network in triggering communications with the wireless device through the access network.

In an example implementation, a service provider network node is configured to carry out the first method described above, or variations thereof. The node includes one or more communication interfaces configured to communicate with a node in or associated with an access network, and further includes a processing circuit operatively associated with the one or more communication interfaces and configured to implement the first method, e.g., to receive and process the allocation information and wireless device signaling as described above. The processing circuit comprises, for example, one or more microprocessor-based processing circuits and associated computer-readable media storing computer program instructions that, when executed by the processing circuit, configure it to carry out processing operations implementing the first method.

As the first method involves operations and signaling at a network node associated with the service provider network, a complementary second method involves operations and signaling at a network node associated with the access network. In an example, this node is configured as an interworking function or IWF, and it communicatively couples the access network and the service provider network.

The IWF comprises a communication interface, which includes one or more physical interface circuits and associated protocol/signaling processors, for communicating with a Home Subscriber Server (HSS) and/or other nodes in the access network (or, equivalently, in a Core Network or CN that is associated with the access network), and for communicating with the service provider network node described above. The IWF further comprises a processing circuit that is operatively associated with the communication interface and is configured to perform the second method or variations thereof. In this regard, the processing circuit comprises one or more microprocessor-based or other digital processing circuitry that is configured at least in part according to the execution of computer program instructions stored in a computer-readable media.

In an example embodiment, the second method as performed by the IWF includes receiving allocation information responsive to a wireless device establishing a data session with the access network for registering for a service provided by the service provider network. As explained, the service provider network is accessible to the wireless device via the access network and the allocation information indicates an external identifier to be used by the service provider network in identifying the wireless device to the access network, and indicates an IP address assigned to the wireless device for the data session. The information may be received from an HSS corresponding to the access network, for example, where the HSS sends the allocation information responsive to the wireless device establishing a data session with the access network, e.g., for sending registration signaling to the service provider network.

The second method further includes forwarding the allocation information to the service provider network. Sending the allocation information in this manner enables the service provider network to subsequently associate the wireless device with the external identifier, based on the wireless device sending point of contact information indicating its assigned IP address, as part of performing registration communications with the service provider network.

An example third method complements the first and second methods and involves operations and signaling at an HSS or other node in or associated with the access network. For example, an HSS includes one or more physical interface circuits and associated protocol/signaling processors, for communicating with the IWF, and for communicating with other nodes as needed and/or directly or indirectly with wireless devices. The HSS further comprises a processing circuit that is operatively associated with the communication interface and configured to perform the third method or variations thereof. In this regard, the processing circuit comprises one or more microprocessor-based or other digital processing circuitry that is configured at least in part according to the execution of computer program instructions stored in a computer-readable media.

In an example embodiment, the third method as performed by the HSS or other appropriately configured node includes, in response to a wireless device establishing a data session with the access network for communicating with an external service provider network, sending allocation information toward the service provider network. Here, sending the allocation information "toward" the service provider network comprises, for example, sending the allocation information to the previously described IWF, for forwarding to the service provider network.

As before, the allocation information indicates an external identifier assigned to the wireless device for use by the service provider network in triggering communication toward the wireless device through the access network, and further indicates an IP address assigned to the wireless device for the data session. The HSS may perform the initial assignment of the external identifier, e.g., from a list or range of external identifiers to be used for wireless devices that have service subscriptions with the external service provider network. As such, the HSS may be provisioned with information mapping International Mobile Subscriber Identities (IMSIs) of a plurality of wireless devices to an access point name or other information identifying the service provider network identifier, and the HSS may bind this information for individual wireless devices with respectively assigned external identifiers, and then send allocation information toward the service provider network for any given one of the wireless devices, in response to that given wireless device establishing a data session with the access network for communicating with the service provider network.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
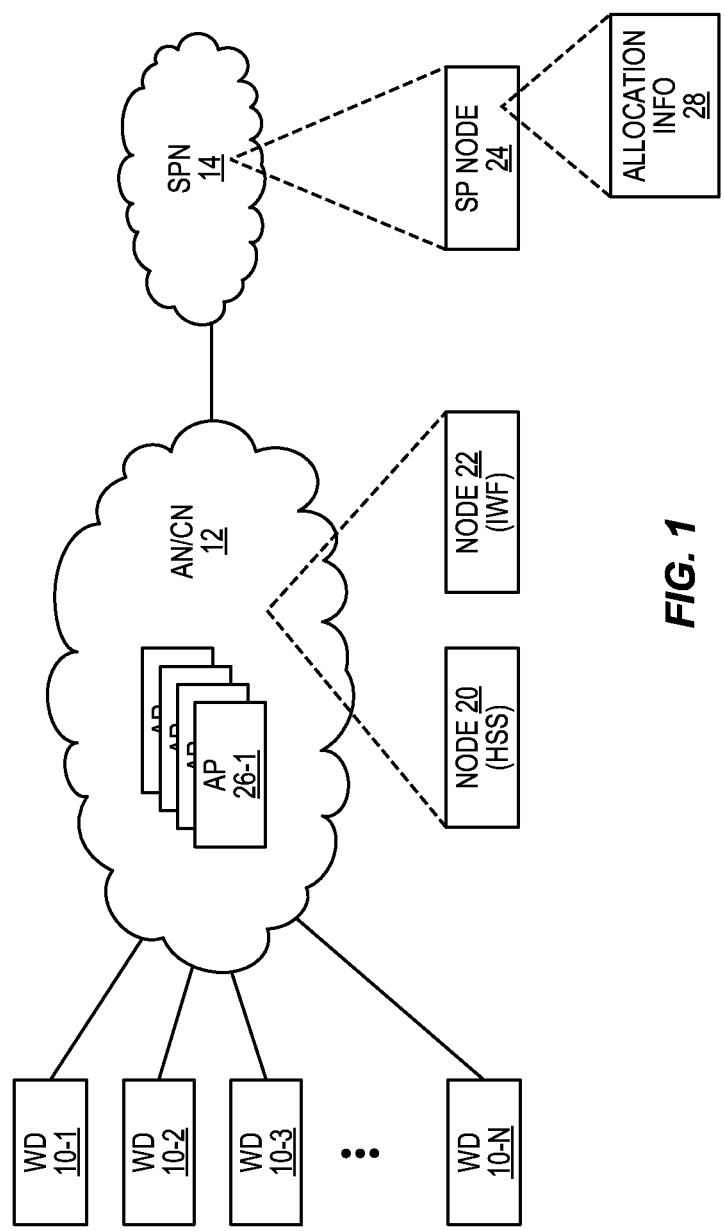
FIG. 1 is a block diagram of example access and service provider networks and associated wireless devices, according to one or more embodiments taught herein.

FIG. 1 illustrates a plurality of wireless devices 10, which are individually referenced as device 10-1, 10-2, and so on, when needed for clarity, and are otherwise referred to generically as "wireless devices 10" in the plural sense and as "wireless device 10" in the singular sense. While connectivity between the wireless devices 10 and an access network 12 is suggested in the diagram, it will be appreciated that not all of the wireless devices 10 are necessarily in operation or connected to the access network 12 at any given instant in time. Note that in the diagram, the access network 12 is abbreviated as "AN/CN 12" merely to connote that there generally are Core Network (CN) entities of interest herein. These entities are discussed later herein.

For now, it should be understood that each wireless device 10 is configured for communication with the access network 12, and for communication with a service provider network 14, which is accessible to the wireless device 10 via the access network 12. In an example case, the access network 12 comprises a Third Generation Partnership Project (3GPP) access network, such as a WCDMA- or LTE-based cellular data network, or a CDMA or HRPD network. Each wireless device 10 comprises a User Equipment or UE, which includes a 3GPP-based radio modem or other such transceiver circuitry for communicating with the 3GPP network. More broadly, the wireless device 10 includes a communication transceiver for communicating with the access network 12, which may be essentially any type of network usable for connecting to the service provider network 14, and includes processing circuitry configured for the appropriate protocols and signaling with respect to both such networks.

In more detail, the wireless device 10 is configured or otherwise provisioned with subscription credentials or other such authentication information as needed to attach to and establish a data session with the access network 12, and as needed for registering for a service provided by the service provider network 14, and communicating with the service provider network 14 in the context of that service. In a non-limiting example, the wireless device 10 hosts a Machine-Type-Communication (MTC) application that is subscribed to a Machine-to-Machine (M2M) service provided in the service provider network 14 operating as an M2M network.

Thus, in initializing or otherwise initially registering the MTC application, the wireless device 10 would attach to the access network 12, establish a data session with the access network 12 for communicating with the service provider network 14, and then use that data session to register the MTC application in the M2M network. According to the advantageous teachings herein, various nodes in the access network 12 and in the service provider network 14 are configured to facilitate that initial registration in a manner that allows the service provider network 14 to bind a service provider network identifier used by the service provider network 14 to identify the wireless device 10 with respect to a service provided by the service provider network 14, to an external identifier that is assigned by the access network 12 to the wireless device 10, for use by the service provider network 14 in identifying the wireless device 10 to the access network 12.

As those of ordinary skill in the art will appreciate, use of the external identifier allows the access network 12 to keep private the International Mobile Subscriber Identity (IMSI) or other such access network identifier of the wireless device 10. That is, the access network 12 does not provide the access network identifier of the wireless device 10 to the service provider network 14 and instead provides an external identifier that has been logically bound to the access network identifier within the access network 12.

In this manner, the IMSI or other sensitive access network identifier of the wireless device 10 is not compromised by releasing it to the external service provider network 14. However, the external identifier itself has no predefined meaning within the service provider network 14, because the service provider network 14 uses the service provider network identifier—e.g., an identifier embedded in service credentials provisioned within the wireless device 10—to identify the wireless device 10. Consequently, without more, simply receiving an external identifier from the access network 12 is of little value to the service provider network 14 because it does not know in advance which one of the plurality of wireless devices 10 has been assigned to the external identifier by the access network 12.

In this regard, these detailed teachings disclose advantageous example configurations for a Home Subscriber Server or HSS, as represented by the node 20, an interworking function or IWF, as represented by the node 22, a service provider network node 24, and the wireless device 10, which uses an access point 26-1, 26-2, and so on, in the access network 12 to access the service provider network 14. More particularly, these detailed teachings disclose example operations at these respective nodes, which provide for an automatic and secure association between the service provider network identifier assigned in the service provider network 14 to any given one among a plurality of wireless devices 10, and the external identifier assigned to that same wireless device 10 by the access network 12.

The generation, propagation and usage of "allocation information" 28 enables such automatic and secure associations, as will be detailed by way of the below examples. As regards a particular wireless device 10, the corresponding allocation information 28 includes, for example, an indication of the external identifier assigned to the wireless device 10 by the access network 12 and an indication of the Internet Protocol (IP) address assigned by the access network 12 for communicating with the service provider network 14.

Figure 2:
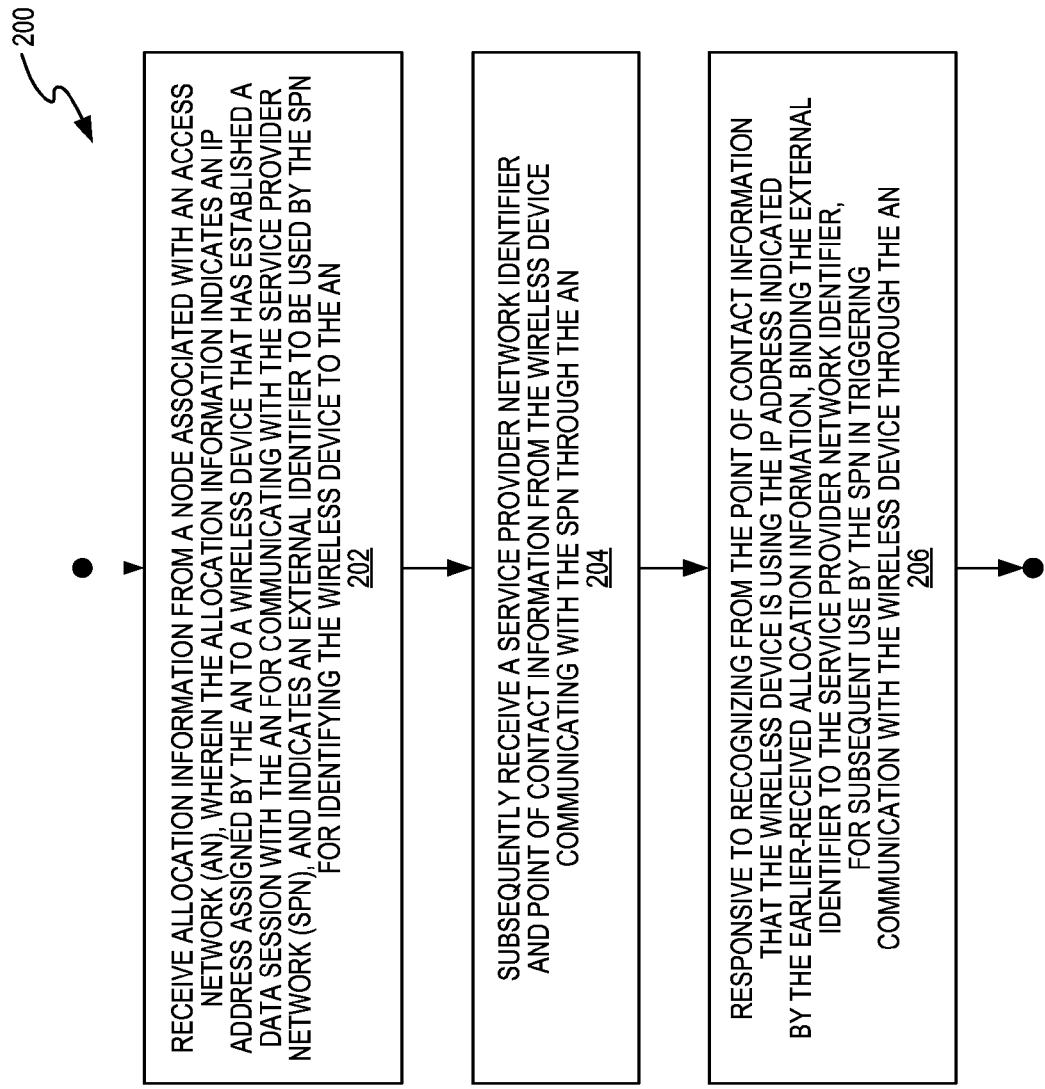
FIG. 2 is a logic flow diagram of one embodiment of a method of processing at a service provider network node.

FIG. 2 illustrates one embodiment of a method 200 performed by the network node 24, which is associated with a service provider network 14. The method 200 can be understood as illustrating one embodiment of processing at the node 24 wherein the node 24 receives allocation information 28 for a given wireless device 10 and uses the allocation information 28 to learn the association between the external identifier of the given wireless device 10 and the service provider network identifier of that given wireless device.

The method 200 according to the example includes receiving (Block 202) such allocation information 28 from a node associated with the access network 12—e.g., from the node 22, referred to hereafter as the IWF 22. The allocation information indicates an Internet Protocol (IP) address assigned by the access network 12 to a wireless device 10 that has established a data session with the access network 12 for communicating with the service provider network 14.

The allocation information also includes the external identifier that has been assigned by the access network 12, for use by the service provider network 14 in identifying the wireless device 10 to the access network 12, e.g., in any subsequent device trigger signaling sent from the service provider network 14 to the access network 12, for triggering communications with the wireless device 10.

At this point in the method 200, it will be understood that a given wireless device 10 has established a data session with the access network 12, for communicating with the service provider network 14, e.g., for performing a service registration. From the received allocation information 28, the service provider network 14 knows the IP address allocated as the PoC of the wireless device 10 within the access network 12 and knows the external identifier of the wireless device 10. However, the service provider network 14 may be configured to provide services to a potentially large plurality of individual wireless devices 10, and the service provider network 14 does not yet know which particular one of those wireless devices 10 is linked to the external identifier received in the allocation information 28.

Thus, the method 200 further includes the node 24 subsequently receiving (Block 204) a service provider network identifier and point of contact information from the wireless device 10 communicating with the service provider network 14 through the access network 12.

The IP address indicated by the point of contact information will match the IP address as indicated in the corresponding allocation information 28 that was earlier received by the service provider network 14. In response to recognizing that the wireless device 10 is using the same IP address (Block 206) that was indicated in allocation information 28 earlier received by the node 24, the method 200 continues with binding the external identifier that was indicated in that earlier-received allocation information 28 to the service provider network identifier of the wireless device 10. This binding establishes a mapping between the external identifier and the service provider network identifier, for subsequent use by the service provider network 14 in triggering communications with the wireless device 10 through the access network 12.

In other words, by recognizing that a given wireless device 10 is using an IP address that is known from previously received allocation information 28 to be associated with a given external identifier, the service provider network node 24 automatically associates that external identifier with the service provider network identifier indicated in signaling received from the wireless device 10. As such, the service provider network identifier knows which external identifier to use for later triggering communication with the wireless device 10 through the access network 12.

It will be understood that the service provider network 14 can receive allocation information 28 for a plurality of wireless devices 10, temporarily store such allocation information 28 for any number of wireless devices 10, and later use the correct allocation information 28 based on the particular IP address used by a given wireless device 10 in communicating with the service provider network 14.

In an example case, a wireless device 10 establishes the data session with the access network 12 for registering for a service that is provided by the service provider network 14 and for which the wireless device 10 includes subscription credentials. In such cases, the wireless device 10 sends registration signaling toward the service provider network 14 using the established data session. Such signaling indicates point of contact information for the wireless device 10—i.e., the IP address assigned to the wireless device 10 as the device point of contact. The registration signaling also includes the service provider network identifier of the wireless device 10, which identifies the wireless device 10 within the service provider network 14, with respect to one or more services for which the wireless device 10 has subscription credentials.

Note, too, that in at least one embodiment of the method 200, there is an additional step or processing operation performed by the node 24 in advance of receiving the allocation information 28. In such embodiments, the node 24 sends a subscription request to the IWF 22, which request indicates that the service provider network 14 should be sent allocation information 28 for wireless devices 10, e.g., on a device-by-device basis, as those devices individually establish data sessions with the access network 12 for communicating with the service provider network 14. In this regard, the HSS 20 or other node in the access network 12 may be provisioned so that it knows a priori which wireless devices 10 are associated with the service provider network 14. Further, the node 24 may be provisioned with the network address or other identifier of the IWF 22, for use in properly directing the subscription request.

Still further, as part of responding to the subscription request from the node 24, the access network 12 in one or more embodiments sends a list of external IDs and, possibly, a list of IP addresses. These lists may comprise actual lists or may be indicated as identified ranges of external IDs and IP addresses. In such embodiments, the allocation information 28 that is sent by the access network 12 for a given wireless device 10 may comprise a list pointer or index value that indicates a particular external identifier in the previously received list, and the same may be done with respect to indicating IP addresses. It will be understood that in such embodiments the node 24 is configured to process the received pointer or index value(s), so as to identify the pointed-to external identifier and/or IP address.

Figure 3:
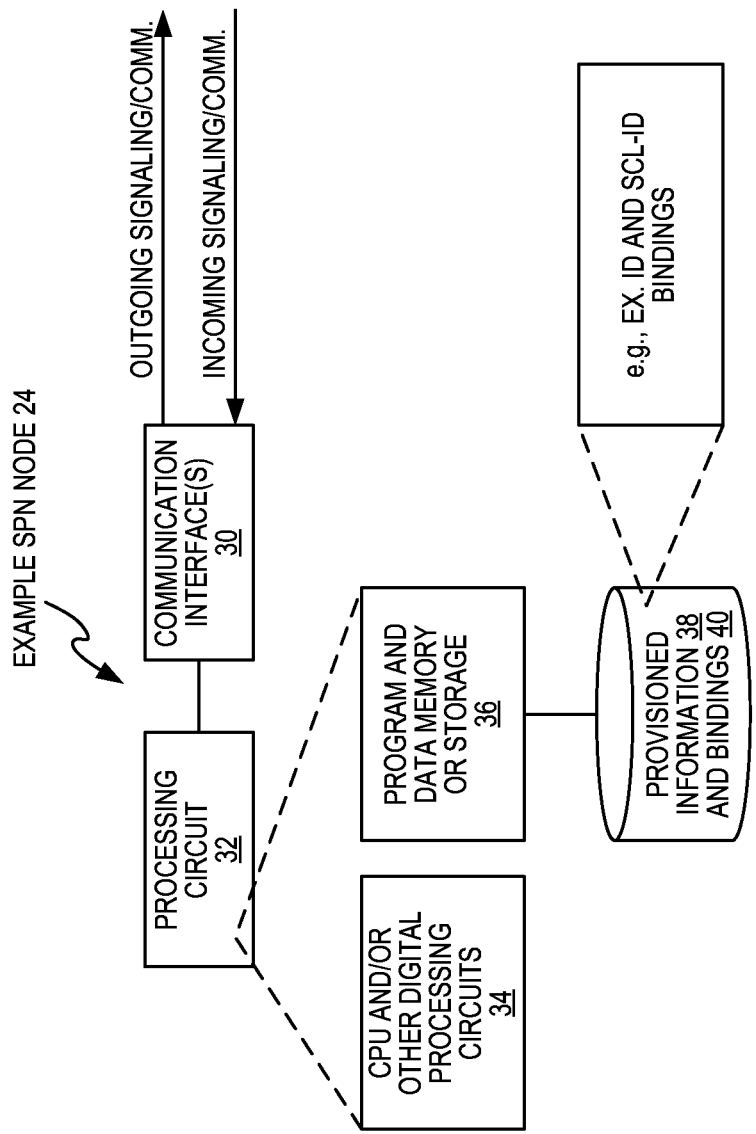
FIG. 3 is a block diagram of one embodiment of a service provider network node configured to perform the method of FIG. 2, for example.

FIG. 3 illustrates an example configuration of the network node 24, which is configured to perform the method 200, for example. The node 24 includes one or more communication interfaces 30 for communicating with the access network 12 and for communicating with the wireless device 10 via signaling conveyed through the access network 12. Thus, the communication interface(s) 30 may comprise more than one interface circuit, or at least may comprise processing circuitry that is configured to implement protocols for communicating with one or more nodes associated with the access network 12, e.g., the IWF 22, and for communicating with the wireless device 10 via the access network 12.

The node 24 further includes a processing circuit 32 that is configured to receive allocation information 28 from a node associated with an access network 12—e.g. from the IWF 22. The allocation information 28 indicates an IP address assigned by the access network 12 to a wireless device 10 that has established a data session with the access network 12 for communicating with the service provider network 14, and further indicates an external identifier assigned by the access network 12, for use by the service provider network 14 in identifying the wireless device 10 to the access network 12.

The processing circuit 32 is further configured to subsequently receive, via the communication interface(s) 30, a service provider network identifier and point of contact information from the wireless device 10 communicating with the service provider network 14 through the access network 12. Such information is received, for example, in registration signaling sent from the wireless device 10.

Still further, the processing circuit 32 is configured to recognize from the point of contact information that the wireless device 10 is using the IP address indicated in earlier-received allocation information 28 and, based on that recognition, bind the external identifier indicated in that same earlier-received allocation information 28 to the service provider network identifier. Such binding establishes a mapping between the external identifier and the service provider network identifier, for subsequent use by the service provider network 14 in triggering communications with the wireless device 10 through the access network 12.

Thus, there is allocation information 28 for any one or more wireless devices 10 that is held at least temporarily in working memory within the node 24. When the node 24 receives signaling from a wireless device 10, the processing circuit 32 compares the IP address determined from that signaling to see whether the IP address of the wireless device 10 matches that indicated in any earlier-received allocation information 28. If the IP address of the wireless device 10 matches the IP address indicated in any earlier-received allocation information 28, the processing circuit 32 binds the service provider network identifier of the wireless device 10 to the external identifier that was indicated in the same allocation information 28 that includes the matched IP address.

As for receiving the service provider network identifier from the wireless device 10, in at least some embodiments, the processing circuit 32 is configured to receive registration signaling from the wireless device 10. That registration signaling is sent after the wireless device 10 has established a data session with the access network 12 and it includes a service provider network identifier of the wireless device 10, along with point of contact information which indicates or maps to the IP address of the wireless device 10. The registration signaling is sent by the wireless device 10 for registering the wireless device 10 for a service provided by the service provider network 14, and the node 24 receives the service provider network identifier of the wireless device 10 in such registration signaling.

In one or more embodiments, the processing circuit 32 is configured to send a subscription request to the IWF 22, e.g., as an initial step in the method 200. As explained earlier, sending the subscription request causes the IWF 22 to subsequently send the allocation information 28 to the network node 24. More particularly, the node 24 sends the subscription request and the IWF 22 forwards it to the HSS 20 or other appropriately configured node. Based on receiving the forwarded subscription request, the HSS 20 or other such node later sends the allocation information 28 to the IWF 22 (i.e., upon the wireless device 10 establishing a data session with the access network 12 for communicating with the service provider network 14) and the IWF 22 forwards the allocation information 28 to the node 24.

The allocation information 28 may actually carry the external identifier, e.g., as a numeric or other value, or may carry an index value that which external identifier has been assigned to the wireless device 10 by the access network 12, from within a list of external identifiers previously sent to the network node 24 by the IWF 22. For example, as earlier noted, the node 24 may send a subscription request to the IWF 22, which forwards it to the HSS 20. In response, the HSS 20 sends a list of external identifiers to the IWF 22, which forwards the list to the node 24.

Thus, in one or more embodiments, the network node 24 includes memory or another computer-readable medium storing provisioned information and the processing circuit 32 is configured to use the provisioned information to identify the IWF 22, and to correspondingly send a subscription request for allocation information 28 to the node 22. It will be understood that the subscription request may be generic or otherwise apply to a potentially large population of wireless devices 10 that are credentialed for one or more services from the service provider network 14 and that the node 24 may receive individual transmissions of allocation information 28 for individual ones of those wireless devices 28, when they individually establish data sessions with the access network 12 for communicating with the service provider network 14.

In some embodiments, the processing circuit 32 is configured to receive a list of external identifiers and, optionally, IP addresses, in advance of receiving allocation information 28. The list may be sent to the node 24 based on the node 24 sending the above-described subscription request, which the node 24 may do as part of its first-time or power-on initialization processing.

In one or more such embodiments, the allocation information 28 includes an index or pointer that identifies the external identifier from among the external identifiers in the list. For example, a range of external identifiers may be pre-allocated or pre-associated with the service provider network 14. The list corresponds to a potentially large plurality of wireless devices 10 that are associated with the service provider network 14—e.g., that have one or more applications credentialed for subscribing to a service provided by the service provider network 14. By sending such a list in advance of sending allocation information 28 for the involved wireless devices 10, the allocation information 28 sent in response to a given wireless device 10 establishing a data session with the access network 12 can include a simple pointer to the external identifier, which may be smaller or otherwise more efficiently signaled than the actual external identifier. The same is true for indicating the IP address assigned to the wireless device 10.

In at least one embodiment, the service provider network 14 comprises a Machine Type Communication (MTC) network. In this context, the service provider network identifier is a Services Capability Layer ID (SCL-ID) associated with an MTC application implemented in the wireless device 10. The processing circuit 32 in such embodiments is configured to bind the external identifier to the SCL-ID, for subsequent use by the service provider network 14 in triggering communications with the wireless device 10 through the access network 12.

In the same or other embodiments, the processing circuit 32 is configured to receive a Device/Gateway Services Capability Layer identity (G/DSCL-ID) and point of contact information in the registration signaling sent from a wireless device 10, and bind the external identifier to the G/DSCL-ID, for subsequent use in directing MTC service communications to the wireless device 10 via the access network 12.

Further in such embodiments, the processing circuit 32 is configured to perform, via communication through the access network 12, a Machine-to-Machine (M2M) service bootstrapping and a corresponding M2M service registration of the MTC application implemented in the wireless device 10. The node 24 receives the SCL-ID from the wireless device 10, and the IP address allocated to the wireless device by the access network, as part of the M2M service registration, and the binding is performed as part of the M2M service registration.

More broadly, it will be appreciated that according to these teachings, the node 24 receives allocation information 28 that indicates the external identifier for a given wireless device 10 and indicates the IP address—explicitly or implicitly—that is assigned to the wireless device 10 for communicating with the service provider network 14. The allocation information 28 thus allows the node 24 to later receive registration signaling from the wireless device 10, detect, through information in the received registration signaling, that the wireless device 10 is using the same IP address as was indicated in the earlier-received allocation information 28, and thereby recognize that the service provider network identifier received from the wireless device 10 in the registration signaling corresponds to the external identifier indicated in the same earlier-received allocation information 28.

Based on this recognition, the processing circuit 32 is configured to bind the external identifier of the wireless device 10 to the service provider network identifier of the wireless device 10. Here, "bind" means to map, link or otherwise logically associate, such as by storing the external identifier and the service provider network identifier together, or by storing a pointer or other data that indicates the pairing.

By performing this binding, the processing circuit 32 thereby establishes a mapping between the external identifier and the service provider network identifier, for subsequent use by the service provider network 14 in triggering communications with the wireless device 10 through the access network 12. For example, it may be that the node 24 needs to send a service-related message to the wireless device 10. The service identifies the wireless device 10 in terms of the service provider network identifier of the wireless device 10. However, for sending the message to the wireless device 10 via the access network 12, the node 24 uses the external identifier bound to the service provider network identifier.

Regardless of such variations, in one or more embodiments, the processing circuit 32 is further configured to subsequently identify the wireless device 10 for a communication related to the service, based on the service provider network identifier of the wireless device 10, map the service provider network identifier to the external identifier, as previously bound to the service provider network identifier, and send the communication toward the wireless device 10 via the access network 12. Here, it will be understood that the communication outgoing from the node 24 uses the external identifier to identify the wireless device 10 to the access network 12.

In some embodiments, the processing circuit 32 is configured to identify the access network 12 from provisioned information 38 stored in the network node 24. For example, with respect to such processing and/or any of the above processing described for the example node 24, the processing circuit 32 may comprise one or more CPUs and/or other digital processing circuits 34, which include or are associated with a computer-readable medium, such as program and data memory or other such storage 36. The storage 36 may comprise more than one memory device or other storage element, such as DRAM operating as working memory and FLASH or other non-volatile storage serving as program memory.

The non-volatile storage holds provisioned information 38. For example, the provisioned information 38 may comprise information identifying the access network 12 and/or particularly identifying the IWF to be used for communicating with the access network 12. The storage also may hold bindings 40, which may comprise data tables or other such logical data arrangements indicating the bindings between respective external identifiers and respective service provider network identifiers. There may be binding information for a plurality of wireless devices 10. Of course, it will be understood that allocation information 28 for any one or more wireless devices 10 also may be held in storage at the node 24, at least until the binding of external identifier to service provider network identifier is accomplished for them.

In any case, the storage 36 in an example configuration stores a computer program comprising computer program instructions. The processing circuit 32 is configured to carry out the processing disclosed herein for the node 24 based at least partially on its execution of the stored computer program instructions, e.g., to carry out the method 200 as described above and/or variations thereof.

Figure 4:
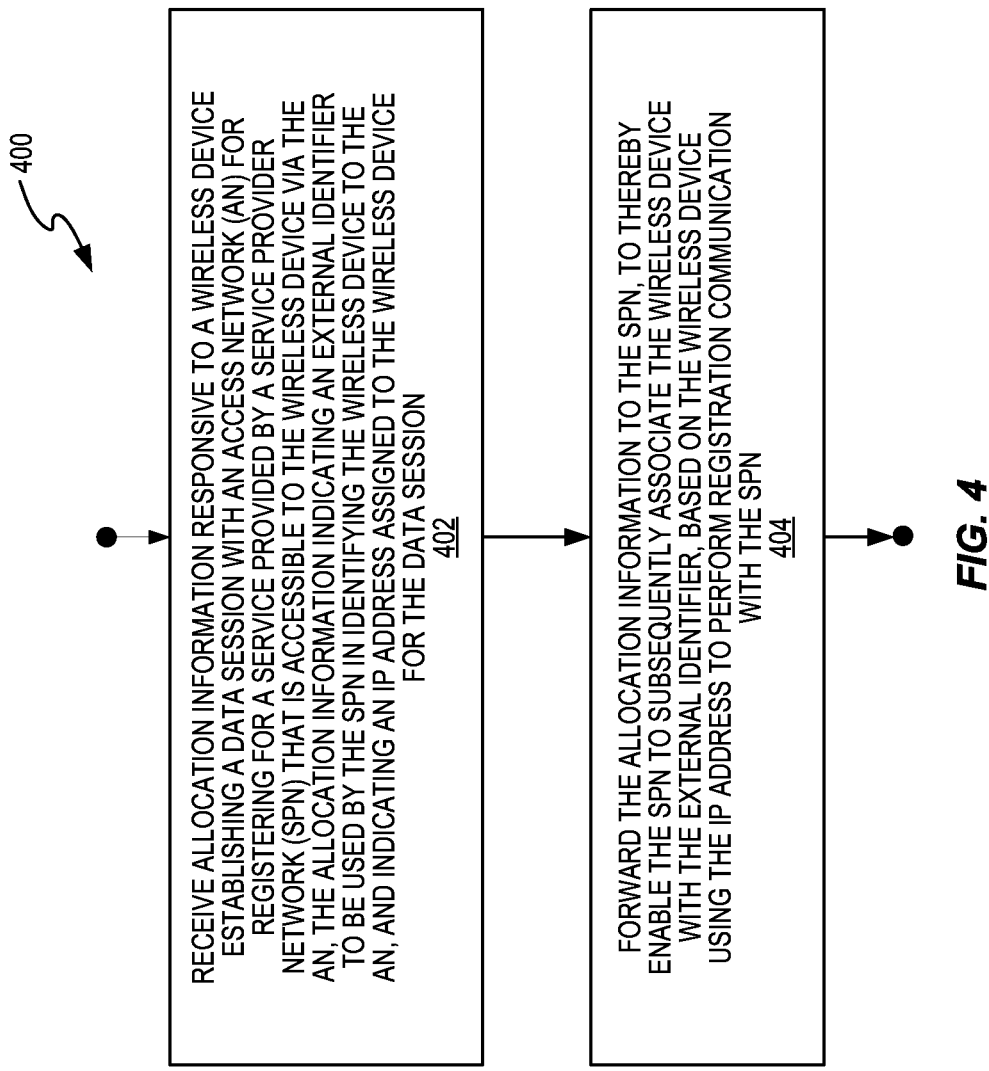
FIG. 4 is a logic flow diagram of one embodiment of a method of processing at a node configured to provide an interworking function (IWF) between an access network and a service provider network.

The operations at the node 24 in the service provider network 14 are complemented by corresponding, complementary operations at the IWF 22. FIG. 4 illustrates one embodiment of a method 400 implemented at the IWF 22, for providing such complementary operation in the access network 12.

The method 400 includes receiving (Block 402) allocation information 28 responsive to a wireless device 10 establishing a data session with an access network 12 for registering for a service provided by a service provider network 14 that is accessible to the wireless device 10 via the access network 12. As an example of this step of operation in the method 400, an HSS 20 or other node is configured to send the allocation information 28 for the wireless device 10 to the IWF 22, in response to the wireless device 10 establishing a data session with the access network 12, for communicating with the service provider network 14.

The method 400 further includes forwarding (Block 404) the allocation information 28 to the service provider network 14, to thereby enable the service provider network 14 to subsequently associate the wireless device 10 with the external identifier, based on the wireless device 10 using the same IP address to perform registration communication with the service provider network 14.

In at least one embodiment of the method 400, the IWF 22 may forward the allocation information 28 responsive to having previously received a subscription request from the service provider network 14, requesting that such information be sent to the service provider network 14. Thus, in an example case, the method 400 includes the initial steps of receiving a subscription request from the service provider network 14 and forwarding that request to the HSS 20 or other appropriately configured node. The method 400 also may include receiving a listing of external identifiers and/or IP addresses from the HSS 20 or other node, responsive to the IWF 22 having forwarded the subscription request from the service provider network 14, and may further include forwarding the list(s) of external identifiers and/or IP addresses to the service provider network 14. By forwarding such list(s), the HSS 20 can generate allocation information 28 that includes indexes or pointers to such lists, for indicating the external identifier and IP address assigned to any given wireless device 10.

As such, in the context of the method 400, it will be understood that the IWF 22 is not necessarily the entity that decides whether allocation information 28 will or will not be provided to the service provider network 14. The IWF 22 may simply act as an intermediary between the HSS 20 and the service provider network node 24, in which role the IWF 22 receives a subscription request from the service provider network 14 and forwards that subscription request to the HSS 20. In turn, the HSS 20 responds to the subscription request by later providing allocation information 28 for any given wireless device 10 that is associated with the service provider network 14, and the IWF 22 passes along such allocation information 28 as provided by the HSS 20—i.e., the IWF 22 sends allocation information 28 to the service provider network 14 in dependence on receiving such information from the HSS 20.

Figure 5:
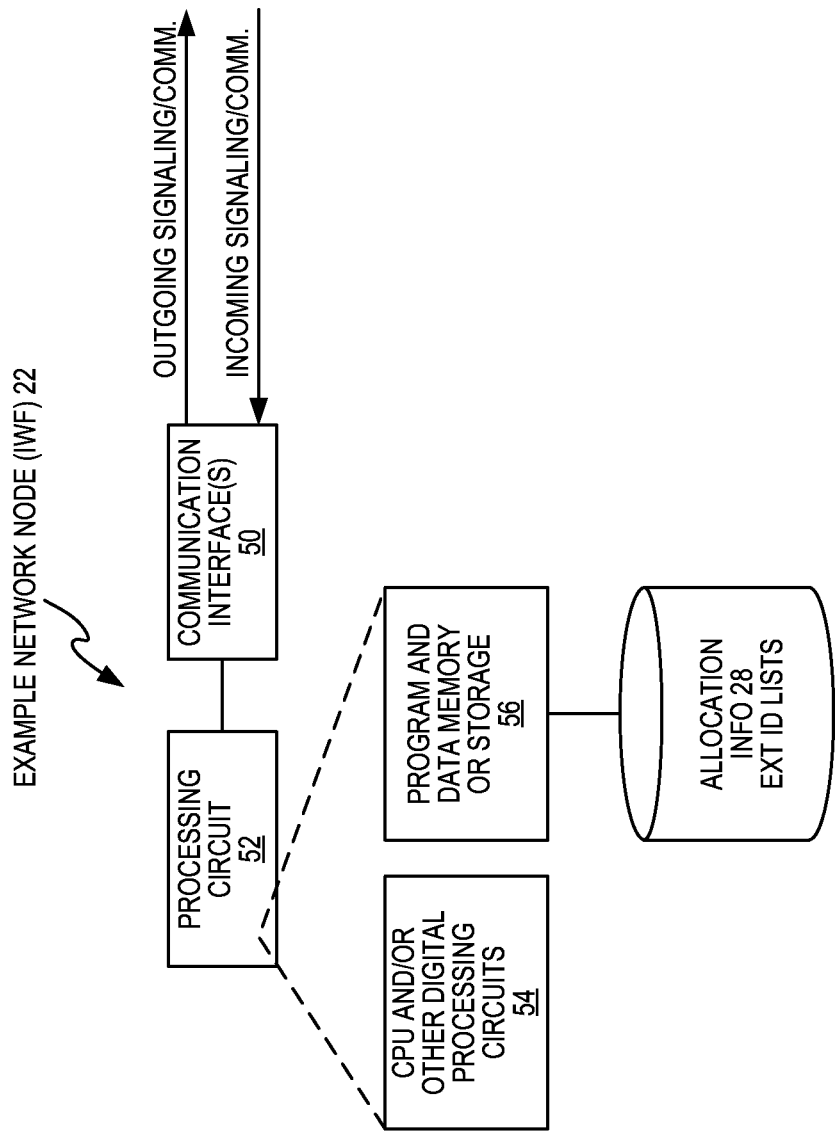
FIG. 5 is a block diagram of one embodiment of an IWF node configured to perform the method of FIG. 4, for example.

FIG. 5 illustrates an example embodiment of the IWF 22, e.g., as configured to carry out the method 400 or variations thereof. The IWF 22 implements an interworking function between an access network 12 and a service provider network 14, and it includes one or more communication interfaces 50 and a processing circuit 52.

The one or more communication interfaces 50 are configured to send signaling toward and to receive signaling from one or more nodes within the access network 12, e.g., an HSS 20, and to send signaling toward and to receive signaling from one or more nodes within the service provider network 14, e.g., the service provider network node 24. The processing circuit 52 is operatively associated with the one or more communication interfaces 50 and is configured to: receive allocation information 28 responsive to a wireless device 10 establishing a data session with an access network 12 for registering for a service provided by a service provider network 14 that is accessible to the wireless device 10 via the access network 12; and forward the allocation information 28 to the service provider network 14, to thereby enable the service provider network 14 to subsequently associate the wireless device 10 with the external identifier, based on the wireless device 10 using the IP address to perform registration communication with the service provider network 14.

As noted, the allocation information 28 may be received at the IWF 22 from an HSS 20 that sends it in dependence upon recognizing that a wireless device 10 that is known to be associated with the service provider network 14 has established a data session with the access network 12, for communicating with the service provider network 14. The processing circuit 52 also may be configured to forward a subscription request for allocation information to the HSS 20, as received from the service provider network 14, and forward to the service provider network 14 any external identifier and/or IP address lists or ranges that are returned from the HSS 20 in response to the forwarded subscription request.

As will be understood by those of ordinary skill in the art, the processing circuit 52 may be implemented as one or more microprocessor-based, DSP-based, FPGA/ASIC-based processing circuits. More generally, the processing circuit 52 comprises one or more digital processing circuits 54 that comprise fixed circuitry, programmed circuitry, or some combination thereof. In at least one embodiment, the digital processing circuit(s) 54 include or are associated with a computer-readable medium, such as one or more memory or storage elements 56 for storing data and program instructions. In at least one such embodiment, the memory or storage elements 56 store computer program instructions for execution by the digital processing circuit(s) 54, where such execution configures that circuitry to carry out the method 400 or variations thereof.

Also note that the memory or storage elements 56 also may be used to hold allocation information 28 sent from the HSS 20 for individual wireless devices 10, at least temporarily, for forwarding to the service provider network 14. Similarly, the memory or storage elements 56 are used by the processing circuit 52 to hold, at least temporarily, any listing of external identifiers and/or IP addresses sent from the HSS 20 and forwarded by the IWF 22 to the service provider network 14. As noted, such information may be sent from the HSS 20 based on the processing circuit 52 being configured to receive a subscription request from the service provider network node 24 and to forward that request to the HSS 20 or other node in the access network 12. That forwarding configures the HSS 20 or other node in the access network to send allocation information 28 for any given wireless device 10 in response to that wireless device 10 establishing a data session with the access network 12, for communicating with the service provider network 14.

In an example configuration, the processing circuit 52 is configured to receive a list of external identifiers in response to forwarding the subscription request to the HSS 20 or other node in the access network 12. Here, respective ones of the external identifiers in the list are mapped to respective ones among the plurality of wireless devices 10 that are associated with the service provider network 14. Correspondingly, the processing circuit 52 is configured to forward the list to the service provider network 14, and to (subsequently) forward the allocation information 28 for any particular one of those wireless devices 10 by forwarding a list pointer or index value that identifies the external identifier of the wireless device 10 within the list. The list pointer may be received from the HSS 20, for forwarding to the service provider network 14.

Sending (forwarding) the allocation information 28 as performed by the IWF 22 according to the configuration of the processing circuit 52, enables the service provider network 14 to later recognize the wireless device 10, based on that wireless device 10 using the IP address that was indicated by the allocation information 28, to communicate with the service provider network 14. Such recognition provides the basis for the service provider network 14 in correctly establishing the relationship between the external identifier of the wireless device 10 and the service provider network identifier of the wireless device 10.

Also, as earlier noted, the service provider network 14 in one or more example embodiments comprises an MTC network that provides an MTC service. In turn, the wireless device 10 hosts an MTC application that is authorized to communicate with the MTC service according to a defined subscription agreement in which the wireless device 10 is identified by an SCL-ID as the aforementioned service provider network identifier.

Figure 6:
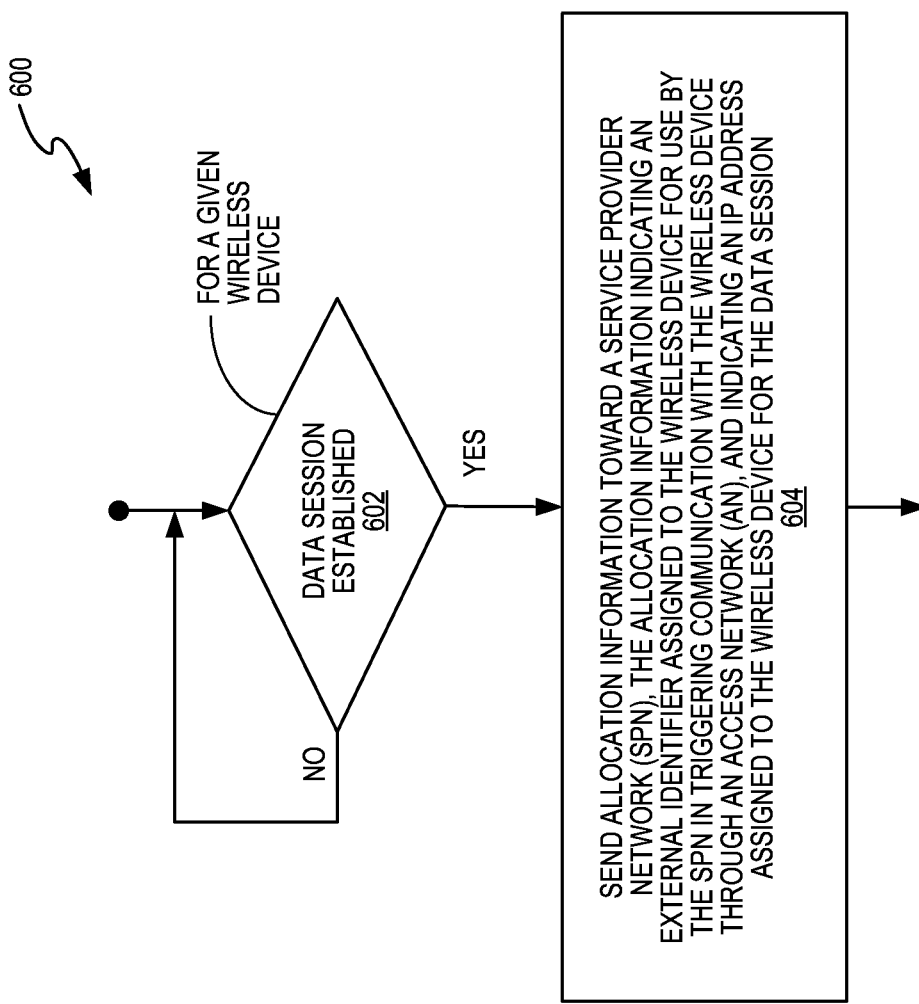
FIG. 6 is a logic flow diagram of one embodiment of a method of processing at an HSS or other node within an access network.

FIG. 6 introduces a method 600, which is implemented at the HSS 20 (or another appropriately configured access network node), and which complements the method 200 implemented by the service provider network node 24, and the method 400 implemented by the IWF in the node 22. The method 600 includes, in response to a wireless device 10 establishing (602) a data session with the access network 12 for communicating with a service provider network 14 that is external to the access network 12, sending (Block 604) allocation information 28 for the wireless device 10 toward the service provider network 14. As explained before, the allocation information 28 indicates the external identifier assigned to the wireless device 10 for use by the service provider network 14 in triggering communication toward the wireless device 10 through the access network 12. Additionally, the allocation information 28 indicates an IP address assigned to the wireless device 10 for the data session. Thus, the allocation information 28 can be regarded as indicating a data pair comprising the external identifier and IP address assigned to the wireless device 10.

The method 600 also may include one or more steps done prior to sending allocation information 28 for any given wireless device 10 that is known to be associated with the service provider network 14. For example, as detailed earlier, the service provider network 14 may send a subscription request, requesting such allocation information 28, and the IWF 22 may forward that subscription request to the HSS 20. Thus, the method 600 may include the initial step of receiving and responding to such subscription requests. In at least one embodiment, responding to such a subscription request comprises the HSS 20 sending one or more lists or ranges to the IWF 22, for forwarding to the service provider network 14 that originated the subscription request. The list(s) or range(s) indicate a set or range of external identifiers that will be used for wireless devices 10 that are associated with the service provider network 14, and, optionally, the IP addresses that will be used for them. Such information allows the HSS 20 to later generate the allocation information 28 for any given one of those wireless devices 10 by simply indicating the index or pointer values that point to the assigned external identifier and IP address within the previously provided list(s) or range(s).

Figure 7:
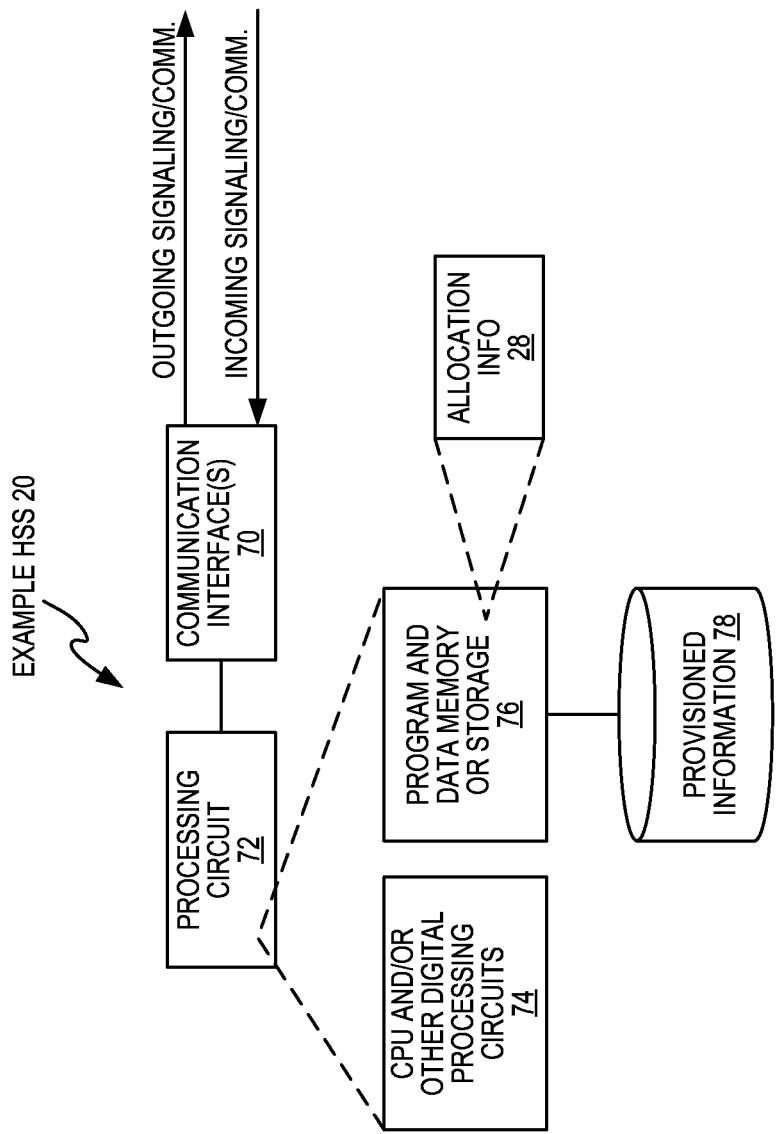
FIG. 7 is a block diagram of one embodiment of an HSS or other node within the access network that is configured to perform the method of FIG. 6, for example.

FIG. 7 illustrates an embodiment of an HSS 20 configured for use in or with an access network 12. The HSS 20 comprises one or more communication interfaces 70 and a processing circuit 72 that is operatively associated with the communication interface(s) 70. The processing circuit 72 comprises one or more CPUs or other digital processing circuits 74. The digital processing circuit(s) 74 include or are associated with a computer-readable medium program, such as program and data memory 76, which may comprise more than one memory circuit and more than one type of memory (e.g., volatile, working storage and non-volatile program and/or configuration data storage).

The program and data memory 76 may store provisioned information 78 identifying one or more service provider networks 14, network address or other contact information for the service provider network(s) 14, and access network identifiers for the wireless devices 10 that are associated with each such service provider network 14. For example, the provisioned information 78 includes a listing of IMSIs for those wireless devices 10 that have subscriptions with a given servicer provider network 14, along with lists or ranges of external identifiers and/or IP addresses to be used for those wireless devices 10.

The one or more communication interfaces 70 are configured to communicate with an IWF 22 that communicatively links the access network 12 to a service provider network 14 that is external to the access network 12, and, in response to a given wireless device 10 establishing a data session with the access network 12 for communicating with a service provider network 14, the processing circuit 72 is configured to send allocation information 28 toward the service provider network 14. The allocation information 28 indicates an external identifier assigned to the wireless device 10 for use by the service provider network 14 in triggering communication toward the wireless device 10 through the access network 12, and further indicates an IP address assigned to the wireless device 10 for the data session.

The processing circuit 72 is configured to determine, e.g., generate, the allocation information 28 from the provisioned information 78 stored in or accessible to the HSS 20. In an example embodiment, the provisioned information 78 includes a range or list of external identifiers for use with wireless devices 10 that are known as being associated with the service provider network 14, and includes an identification of the service provider network 14.

Further, as noted earlier, the processing circuit 72 in some embodiments is configured to receive a subscription request for the allocation information 28 from the IWF 22, and to send the allocation information 28 to the IWF 22 conditioned on having first received the subscription request. Of course, as noted, the subscription request is not necessarily a request for specific allocation information 28 for a particular one of the wireless devices 10 that are associated with the service provider network 14. Instead, there may be a potentially large plurality of wireless devices 10 that are a priori known from the provisioned information 78 at the HSS 20 to be associated with the service provider network 14. Thus, the subscription request is understood to be a general request for allocation information 28 for individual ones of the wireless devices 10 at whatever later times those individual wireless devices 10 establish data sessions with the access network 12 for communicating with the service provider network 14.

Figure 8:
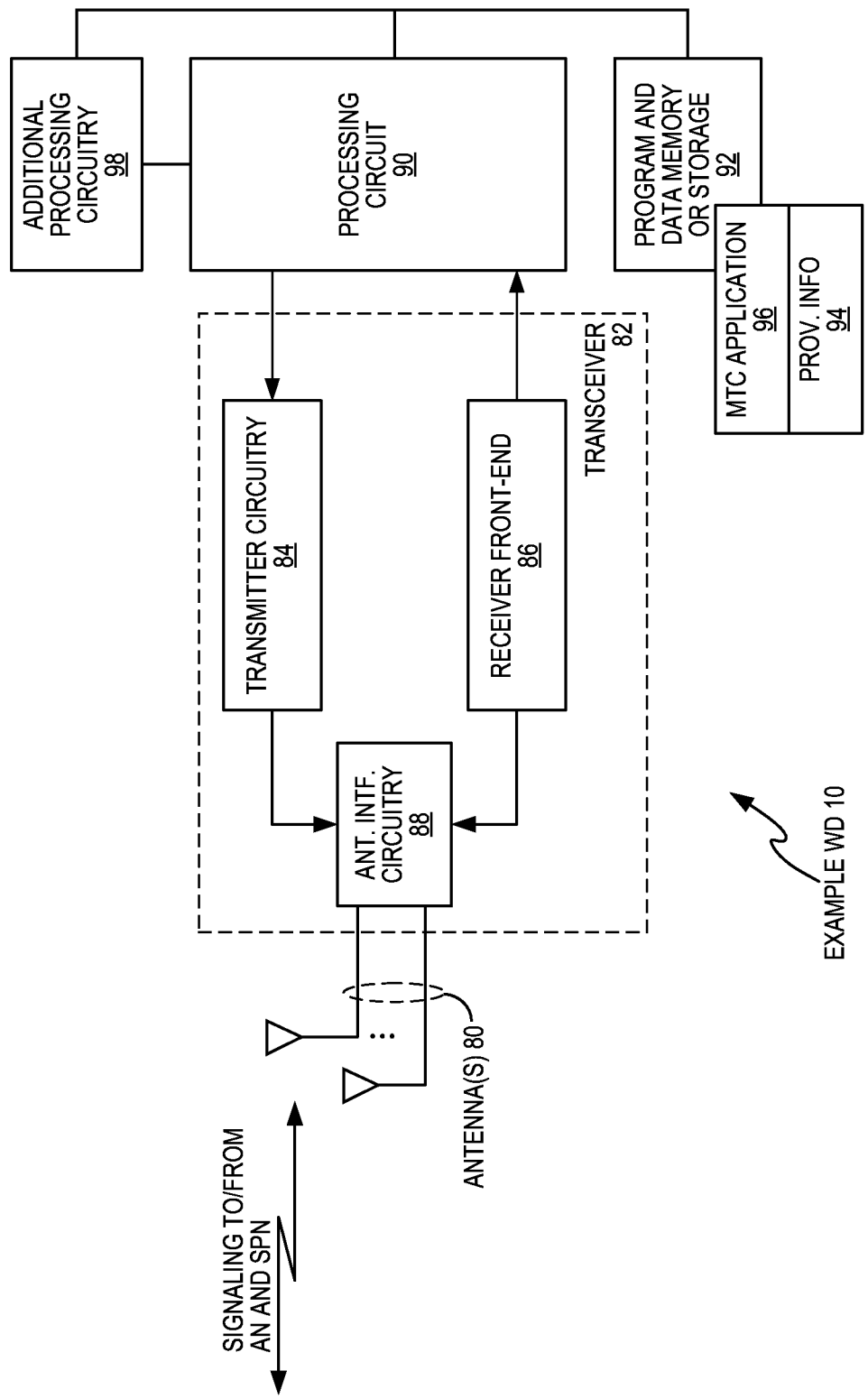
FIG. 8 is a block diagram of one embodiment of a wireless device.

Turning to an example wireless device 10, FIG. 8 illustrates one embodiment of a wireless device 10 that includes a one or more transmit and receive antennas 80 and an associated communication transceiver 82. The communication transceiver 82 includes transmitter circuitry 84, a receiver front-end 86, and antenna interface circuitry 88. The wireless device 10 further includes one or more processing circuits 90, which include or are associated with program data memory or other such storage 92. The storage 92 includes, for example, provisioned information 94 and an application 96 that uses a service provided by the service provider network 14. In an example case, execution of the application 96 by the processing circuit 90 configures the wireless device 10 for communication with the service provider network 14. The application 96 may comprise a MTC application and the provisioned information 94 may include subscription credentials or other information enabling the MTC application to use an M2M service provided by a service provider network 14.

In any case, it will be understood that the processing circuit 90 may comprise baseband processing circuits and other supporting circuitry needed for authenticating to the access network 12 and communicating with the access network 12, via the transceiver 82. For example, the transceiver 82 may comprise a cellular radio transceiver configured according to one or more cellular network standards, such as the GSM, WCDMA and/or LTE standards.

Further, while such functionality may be implemented using functionally or physically separate processors, the processing circuit 90 may further include one or more "application processors," which are microprocessors or other digital processing circuitry configured to host/execute the application 96. The additional processing circuitry 98 may supplement such functionality, e.g., by providing user interfaces, I/O circuitry for interfacing with monitoring and/or control systems, etc.

The processing circuit 90 is further configured to establish a data session with the access network 12, for registering for a service with the service provider network 14, and to send registration signaling to the service provider network 14 via that data session. Advantageously, the registration signaling indicates the IP address allocated to the wireless device by the access network as its point of contact, as well as the service provider network identifier of the wireless device 10, which identifies the wireless device 10 with respect to a service provided by the service provider network 14.

As noted above, the service provider network 14 is an MTC network in an example configuration, and the application 96 is an MTC application that interacts with an M2M service provided by the MTC network. As such, the processing circuit 90 is configured to perform the registration for the service as an M2M SCL registration with the MTC network.

Figure 9:
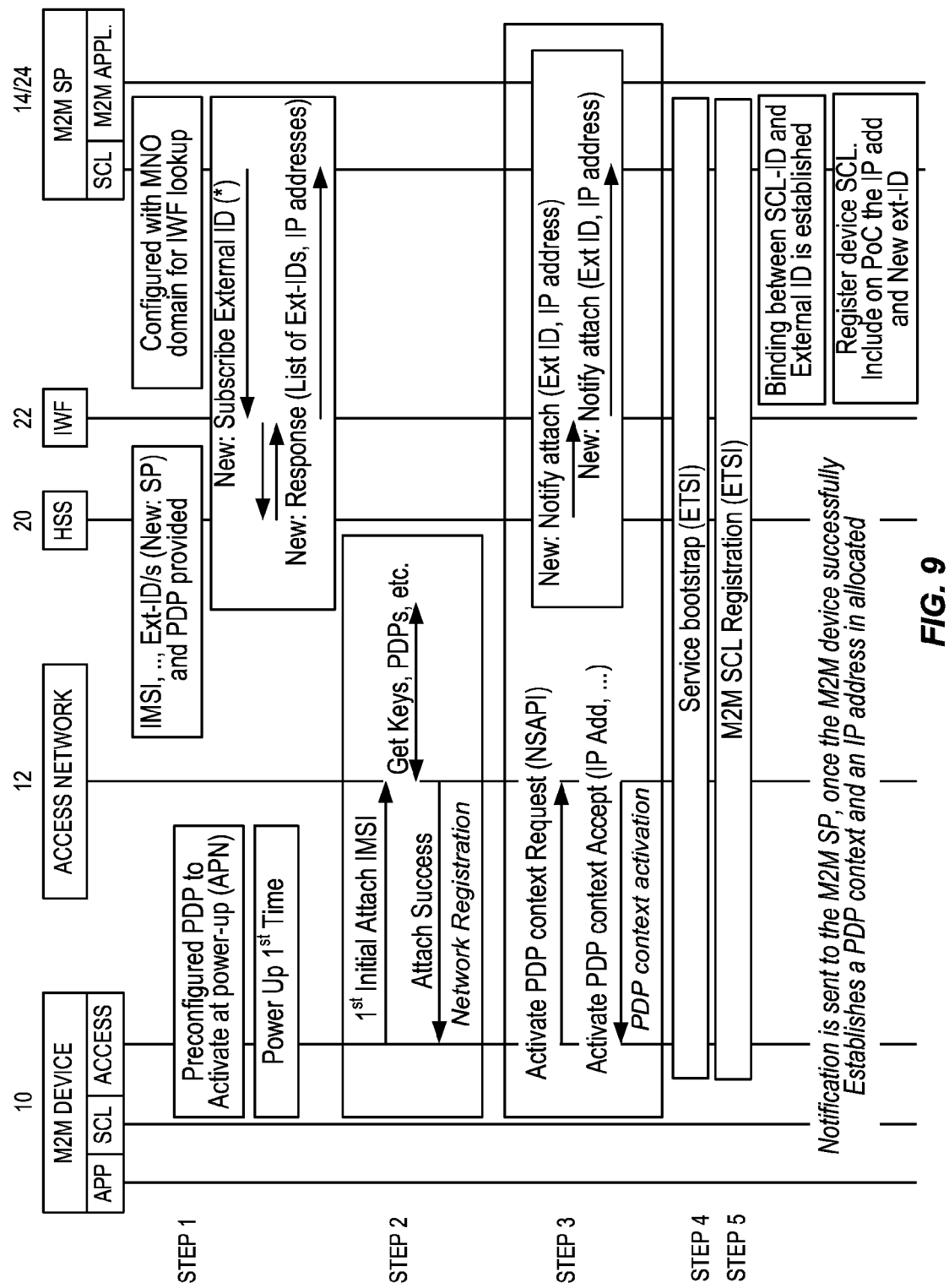
FIG. 9 is a signal flow diagram of an overall set of signaling between a service provider network node, an IWF node, an HSS node, and a wireless device, according to one embodiment of the teachings herein.

FIG. 9 illustrates one embodiment for the overall signal flow in such a MTC-based embodiment. In the illustrated signal flow, the HSS 20 is assumed to incorporate Access/ Authorization/Accounting (AAA) Radius functionality to simplify the call flow. Further, the wireless device 10 is represented as an "M2M Device" that includes an "Access" block configured for attaching to the access network 12 and establishing a data session with the access network 12, an "SCL" block representing the Services Capability Layer (SCL) functionality of the M2M device, and an "App" block representing the M2M application functionality.

Similarly, the service provider network 14 and associated service provider network node 24 are represented as an M2M Service Provider (SP) entity that includes a Network Services Capability Layer (NSCL) functional block, and an M2M Application (M2M APPL), which provides an M2M service to wireless devices 10 include a complementary M2M application and proper subscription credentials.

At Step 1, at power-on, the M2M NSCL in the service provider network 14 subscribes to the IWF 22 belonging to the access network 12 in question, requesting that the M2M NSCL be notified of the external identifier when an M2M device is allocated a new IP address. The IWF 22 in turn subscribes to HSS/AAA 20 for such information. The HSS/ AAA 20 responds to the subscription request from the IWF 22, which in turn returns an acknowledgement response to the M2M NSCL. Given that this is the first subscription, the returned response includes a list of IP addresses allocated to M2M devices, and the external IDs allocated to them.

At Step 2, the access part of the M2M device is authenticated for accessing the access network 12. Once successfully authenticated, the M2M device access profile shall be downloaded in the access network 12 for enforcement purposes.

At Step 3, the SCL of the M2M device establishes a bearer with an access point that corresponds to the M2M SP for SCL of the M2M device. This implies that each SCL within the M2M device knows the APN associated with the targeted service provider network 14 and uses that APN for bearer establishment. Such information may be pre-configured in the M2M device (if multiple SCLs are used/supported, otherwise a default APN can be used). Following the bearer establishment, HSS/AAA 20 sends a notification to the IWF 22 including the allocated IP address and the external identifier of the M2M device SCL. The IWF 22 in turn forwards this allocation information 28 to the M2M NSCL in the service provider network 14.

At this point the M2M NSCL does not know to which SCL-ID this external ID belongs; it learns the association later in Step 5. In Step 4, the SCL in the M2M device performs a service bootstrap with the M2M NSCL using existing ETSI procedures, and in Step 5, the SCL of the M2M device registers with the M2M NSCL using existing ETSI procedures. Following that step, the M2M NSCL locates the IP address and the external ID earlier received in Step 3, and thus establishes a binding between the external ID and SCL-ID of the M2M device. This binding may be stored in the service provider network 14 in the data structure or memory resources representing the M2M Point-of-Contact (PoC), received from the wireless device during service registration in step 5, and used for directing service communications to the M2M device.

One scenario in which these teachings are of particular use is that in which the access network 12 has not provisioned the external service provider network 14 with the external identifiers allocated to the device subscriptions for a plurality of wireless devices 10, or not provisioned the wireless devices 10 for that matter. In general these teachings may be used to retrieve the access network identifier of a given wireless device 10 that has a subscription with an external service provider network 14, without having to share that access network identifier with the external network. Further, these teachings provide a mechanism by which the external service provider network 14 can establish a connection between a given wireless device 10 and the external service provider network 14, based on associating the service provider network identifier of the wireless device 10 with the IP address of the wireless device 10.

Of course, these teachings can be applied to other than wireless devices 10 and these teachings have particular advantages in the context of M2M devices, where a large plurality of M2M devices must attach to an access network 12 for registering for an M2M service provided by an M2M service provider. Once a given M2M device successfully attaches to an access network 12, its external identifier is passed to the M2M NSCL, along with the IP address that has been assigned to the M2M device for communicating with the M2M service provider.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method at a network node that is associated with a service provider network, said method comprising:
receiving allocation information from a node associated with an access network, wherein the allocation information indicates an IP address assigned by the access network to a wireless device that has established a data session with the access network for communicating with the service provider network, and further indicates an external identifier assigned by the access network, for use by the service provider network in identifying the wireless device to the access network;
subsequently receiving a service provider network identifier and point of contact information from the wireless device communicating with the service provider network through the access network; and
responsive to recognizing from the point of contact information that the wireless device is using the IP address, binding the external identifier received in the allocation information from the access network to the service provider network identifier, to thereby establish a mapping between the external identifier and the service provider network identifier, for subsequent use by the service provider network in triggering communications with the wireless device through the access network.

2. The method of claim 1, wherein subsequently receiving the service provider network identifier and the point of contact information from the wireless device comprises receiving registration signaling from the wireless device, as sent through the access network via the data session, for registering the wireless device for a service provided by the service provider network.

3. The method of claim 1, further comprising receiving the allocation information from the node, based on previously sending a subscription request to the node.

4. The method of claim 1, wherein the allocation information indicates the external identifier either by including the external identifier, or by including an index value indicating which external identifier has been assigned to the wireless device by the access network, from within a list of external identifiers previously sent to the network node by the node.

5. The method of claim 1, wherein the service provider network comprises a Machine Type Communication (MTC) network, wherein the service provider network identifier is a Services Capability Layer ID (SCL-ID) associated with an MTC application implemented in the given wireless device, and wherein binding the external identifier to the service provider network identifier comprises binding the external identifier to the SCL-ID, for subsequent use by the service provider network in triggering communications with the wireless device through the access network.

6. The method of claim 5, wherein subsequently receiving the service provider network identifier and the point of contact information from the wireless device comprises performing, via communication through the access network, a Machine-to-Machine (M2M) service bootstrapping and a corresponding M2M service registration of the MTC application implemented in the given wireless device, and wherein said binding is performed as part of the M2M service registration.

7. A network node for use in association with a service provider network, said network node comprising:
one or more communication interfaces configured to communicate with a node in or associated with an access network; and
a processing circuit operatively associated with the one or more communication interfaces and configured to:
receive allocation information from a node associated with an access network, wherein the allocation information indicates an IP address assigned by the access network to a wireless device that has established a data session with the access network for communicating with the service provider network, and further indicates an external identifier assigned by the access network, for use by the service provider network in identifying the wireless device to the access network;
subsequently receive, via the one or more communication interfaces, a service provider network identifier and point of contact information from the wireless device communicating with the service provider network through the access network; and
responsive to recognizing from the point of contact information that the wireless device is using the IP address, bind the external identifier to the service provider network identifier, to thereby establish a mapping between the external identifier and the service provider network identifier, for subsequent use by the service provider network in triggering communications with the wireless device through the access network.

8. The network node of claim 7, wherein the processing circuit is configured to receive registration signaling from the wireless device, as sent through the access network, for registering the wireless device for a service provided by the service provider network, and wherein the service provider network identifier and the point of contact information is received in the registration signaling.

9. The network node of claim 7, wherein the processing circuit is configured to send a subscription request to the node, to cause the node to subsequently send the allocation information to the network node.

10. The network node of claim 7, wherein the allocation information includes the external identifier, or by includes an index value indicating which external identifier has been assigned to the wireless device by the access network, from within a list of external identifiers previously sent to the network node by the node.

11. The network node of claim 7, wherein the service provider network comprises a Machine Type Communication (MTC) network, wherein the service provider network identifier is a Services Capability Layer ID (SCL-ID) associated with an MTC application implemented in the given wireless device, and wherein the processing circuit is configured to bind the external identifier to the SCL-ID, for subsequent use by the service provider network in triggering communications with the wireless device through the access network.

12. The network node of claim 11, wherein the processing circuit is configured to perform, via communication through the access network a Machine-to-Machine (M2M) service bootstrapping and a corresponding M2M service registration of the MTC application implemented in the given wireless device, and to receive the SCL-ID and the point of contact information from the wireless device as part of the M2M service registration, and wherein said binding is performed as part of the M2M service registration.

13. The network node of claim 7, wherein the network node includes memory or another computer-readable medium storing provisioned information and wherein the processing circuit is configured to use the provisioned information to identify the node, and to correspondingly send a subscription request for the allocation information to the node.

14. A method at a network node comprising:
receiving allocation information responsive to a wireless device establishing a data session with an access network for registering for a service provided by a service provider network that is accessible to the wireless device via the access network, the allocation information indicating an external identifier assigned by the access network, for use by the service provider network in identifying the wireless device to the access network, and indicating an IP address assigned to the wireless device for the data session; and
forwarding the allocation information to the service provider network, to thereby enable the service provider network to subsequently associate the wireless device with the external identifier, based on the wireless device using the IP address to perform registration communication with the service provider network.

15. The method of claim 14, further comprising receiving the allocation information from a Home Subscriber Server (HSS) in the access network.

16. The method of claim 14, further comprising forwarding the allocation information responsive to having previously received a subscription request from the service provider network, requesting that such information be sent to the service provider network.

17. The method of claim 16, wherein the allocation information includes the external identifier or includes an indicator indicating which external identifier has been allocated to the wireless device, from among a listing of external identifiers sent to the service provider network responsive to the subscription request.

18. A network node configured to implement an interworking function (IWF) between an access network and a service provider network, said network node comprising:

one or more communication interfaces configured to send signaling toward and to receive signaling from one or more nodes within the access network, and to send signaling toward and to receive signaling from one or more nodes within the service provider network; and a processing circuit operatively associated with the one or more communication interfaces and configured to:

receive allocation information responsive to a wireless device establishing a data session with an access network for registering for a service provided by a service provider network that is accessible to the wireless device via the access network, said allocation information indicating an external identifier assigned by the access network, for use by the service provider network in identifying the wireless device to the access network, and indicating an IP address assigned to the wireless device for the data session; and forward the allocation information to the service provider network, to thereby enable the service provider network to subsequently associate the wireless device with the external identifier, based on the wireless device using the IP address to perform registration communication with the service provider network.

19. The network node of claim 18, wherein the network node is configured to receive the allocation information from a Home Subscriber Server (HSS) in the access network.

20. The network node of claim 18, wherein the processing circuit is configured to forward the allocation information responsive to having previously received a subscription request from the service provider network, requesting that the allocation information be sent to the service provider network.

21. The network node of claim 20, wherein the allocation information includes the external identifier, or includes an indicator indicating which external identifier has been allocated to the wireless device, from among a list of external identifiers previously sent to the service provider network in response to the subscription request.

22. A method in a network node configured as a Home Subscriber Server (HSS) in an access network, said method comprising, in response to a wireless device establishing a data session with the access network for communicating with a service provider network that is external to the access network:

sending allocation information toward the service provider network, said allocation information indicating an external identifier assigned to the wireless device by the access network, for use by the service provider network in triggering communication toward the wireless device through the access network, and further indicating an IP address assigned to the wireless device for the data session.

23. The method of claim 22, further comprising determining the allocation information from provisioned information stored in or accessible to the HSS, said provisioned information including a range or listing of external identifiers for use with wireless devices associated with the service provider network, and including an identification of the service provider network.

24. The method of claim 22, wherein sending the allocation information toward the service provider network comprises sending the allocation information to an interworking function (IWF) from which a subscription request for the allocation information was previously received, and wherein said step of sending is conditioned on having received the subscription request.

25. A network node configured as a Home Subscriber Server (HSS) in an access network, said network node comprising:

one or more communication interfaces configured to communicate with an interworking function (IWF) that communicatively links the access network to a service provider network that is external to the access network;

a processing circuit that is operatively associated with the one or more communication interfaces and, in response to a wireless device establishing a data session with the access network for communicating with the service provider network, is configured to:

send allocation information toward the service provider network, said allocation information indicating an external identifier assigned to the wireless device by the access network, for use by the service provider network in triggering communication toward the wireless device through the access network, and further indicating an IP address assigned to the wireless device for the data session.

26. The network node of claim 25, wherein the processing circuit is configured to determine the allocation information from provisioned information stored in or accessible to the HSS, said provisioned information including a range or listing of external identifiers for use with wireless devices associated with the service provider network, and including an identification of the service provider network.

27. The network node of claim 25, wherein the processing circuit is configured to receive a subscription request for the allocation information from the IWF, and to send the allocation information to the IWF conditioned on having received the subscription request.

* * * * *